(12) United States Patent
Ferrand et al.

(10) Patent No.: US 10,240,872 B2
(45) Date of Patent: Mar. 26, 2019

(54) INDIRECT CHARGE-AIR COOLER

(71) Applicant: Mahle International GmbH, Stuttgart (DE)

(72) Inventors: Nicolas Ferrand, Stuttgart (DE); Olaf Schoettle, Renningen (DE)

(73) Assignee: Mahle International GmbH (DE)

( * ) Notice: Subject to any disclaimer, the term of this patent is extended or adjusted under 35 U.S.C. 154(b) by 324 days.

(21) Appl. No.: 15/334,852

(22) Filed: Oct. 26, 2016

(65) Prior Publication Data
US 2017/0115069 A1 Apr. 27, 2017

(30) Foreign Application Priority Data
Oct. 27, 2015 (DE) .......... 10 2015 220 965

(51) Int. Cl.
F28D 7/16 (2006.01)
F02B 29/04 (2006.01)
(Continued)

(52) U.S. Cl.
CPC ............ F28D 7/163 (2013.01); F02B 29/045 (2013.01); F02B 29/0437 (2013.01); F02B 29/0462 (2013.01); F02M 35/10268 (2013.01); F28D 7/1684 (2013.01); F28F 3/025 (2013.01); F28F 9/0219 (2013.01); F28F 9/0224 (2013.01);
(Continued)

(58) Field of Classification Search
CPC .... F28D 7/163; F02B 29/045; F02B 29/0462; F28F 9/0224; F28F 9/0226
See application file for complete search history.

(56) References Cited

U.S. PATENT DOCUMENTS 9,097,466 B2 * 8/2015 Braic .................... F28D 7/1692
2008/0121384 A1 * 5/2008 Tseng .................. F28D 1/05375
165/149
(Continued)

FOREIGN PATENT DOCUMENTS

DE 102005013922 A1 9/2006
DE 102008018594 A1 10/2008
(Continued)

OTHER PUBLICATIONS

European Search Report dated Mar. 27, 2017 related to corresponding European Patent Application No. 16194590.2.
(Continued)

Primary Examiner — Jacob Amick
(74) Attorney, Agent, or Firm — Fishman Stewart PLLC

(57) ABSTRACT

A heat exchanger, such as an indirect charge-air cooler for an internal combustion engine, may include a first duct system including a plurality of pipes, a second duct system, a collector including a base part and a box part, and at least two opposite side parts. The plurality of pipes may be arranged between the side parts, and the first duct system may be fluidically separated from the second duct system. The box part may bear against at least one of the side parts via a first contact surface. At least one frame part may be provided and coupled in a non-positively locking connection and/or a cohesive connection, for example by pressing and/or brazing, to a respective outer edge of the side parts, a respective outer edge of the base part, and/or a respect outer edge of the box part.

20 Claims, 3 Drawing Sheets

(51) Int. Cl.
    *F28F 3/02* (2006.01)
    *F28F 9/02* (2006.01)
    *F02M 35/10* (2006.01)
    *F28D 21/00* (2006.01)

(52) U.S. Cl.
    CPC .......... *F28F 9/0226* (2013.01); *F28F 9/0263* (2013.01); *F28D 2021/0082* (2013.01); *F28F 2225/02* (2013.01); *F28F 2250/106* (2013.01); *F28F 2275/04* (2013.01); *F28F 2275/10* (2013.01); *Y02T 10/146* (2013.01)

(56) References Cited

U.S. PATENT DOCUMENTS

| | | | |
|---|---|---|---|
| 2012/0061053 A1 | 3/2012 | Geskes et al. | |
| 2017/0089253 A1* | 3/2017 | Somhorst | F01P 3/12 |

FOREIGN PATENT DOCUMENTS

| | | |
|---|---|---|
| DE | 102009012024 A1 | 9/2010 |
| DE | 102009035251 A1 | 3/2011 |
| EP | 1707911 A1 | 10/2006 |
| FR | 2991039 A1 | 11/2013 |
| FR | 2992715 A1 | 1/2014 |
| WO | WO-2014/001366 A1 | 1/2014 |
| WO | WO-2014140119 A1 | 9/2014 |

OTHER PUBLICATIONS

English abstract for DE-102005013922.
English abstract for DE-102009035251.
German Search Report for DE-102015220965.2, dated Jun. 15, 2016.

* cited by examiner

INDIRECT CHARGE-AIR COOLER

CROSS-REFERENCE TO RELATED APPLICATIONS

This application claims priority to German Patent Application No. 10 2015 220 965.2, filed Oct. 27, 2015, the contents of which are hereby incorporated by reference in its entirety.

TECHNICAL FIELD

The present invention relates to a heat exchanger, in particular an indirect charge-air cooler for an internal combustion engine. The invention also relates to an internal combustion engine having a heat exchanger of said type designed as a charge-air cooler.

BACKGROUND

WO 2014/001366 A1 has disclosed a generic heat exchanger having pipes which form a first duct system for a first fluid which flows in a first flow direction. Between said pipes there is formed a second duct system, which is fluidically separated from the first duct system, for a second fluid. Furthermore, two collectors which are fluidically separated from the second duct system are provided, of which collectors at least one has a base part and a box part which delimit a collecting chamber, which is fluidically connected to at least one of the pipes, of the collector. Here, each base part has openings in the form of rim holes to which the pipes are connected such that the associated collecting chamber is fluidically separated from the second duct system. Furthermore, the pipes are arranged between two opposite side parts for the fluidic delimitation of the second duct system.

WO 2014/140119 A1 has disclosed a further heat exchanger, in this case in the form of a plate-type heat exchanger.

Indirect charge-air coolers that have hitherto been known are normally integrated into an intake module of an internal combustion engine and installed together with the latter. A disadvantage here was in particular a relatively cumbersome plastics housing for the intake module and the use of tension anchors in order to be able to accommodate the relatively high pressures. The space to be kept in reserve for the tension anchors was not available for a heat exchanger surface, such that charge-air coolers integrated directly into the intake module had a reduced heat exchanger volume, and furthermore required additional seals.

SUMMARY

The present invention is therefore concerned with the problem of specifying, for a heat exchanger of the generic type, an improved or at least alternative embodiment which, in particular, exhibits greater power and is of more lightweight construction.

Said problem is solved according to the invention by way of the subject matter of the independent Claim(s). The dependent claims relate to advantageous embodiments.

The present invention is based on the general concept of a heat exchanger in the form of an indirect charge-air cooler no longer being integrated into the housing of an intake module but rather being equipped with a dedicated, specially assembled housing, whereby the heat exchanger according to the invention is not only of more compact construction but is also highly resistant to pressure and temperature and can furthermore provide a larger heat exchanger surface than would be possible in the case of a previous integration into an intake module. Furthermore, in this way, it is also possible for the heat exchanger according to the invention to be arranged at some other location, for example on an internal combustion engine. Here, the heat exchanger according to the invention has pipes which form a first duct system for a first fluid flowing in a first flow direction, wherein, between the pipes, there is formed a second duct system, which is fluidically separated from the first duct system, for a second fluid which can be caused to flow through in a second flow direction. Here, the first and the second flow direction are normally orthogonal with respect to one another. Furthermore, the heat exchanger has two collectors which are fluidically separated from the second duct system and of which at least one has a base part and a box part which delimit a collecting chamber, which is fluidically connected to at least one of the pipes, of the collector. Here, each base part has openings, for example rim holes, in which the pipes are received, or to which the pipes are connected, such that the associated collecting chamber is fluidically separated from the second duct system. Here, the pipes are arranged between two opposite side parts for the fluidic delimitation of the second duct system. According to the invention, it is now the case that at least one base part transitions, in a surface-flush manner, into at least one associated side part, wherein the at least one base part may bear by way of a linear second contact surface against at least one side part, or else a gap exists between these. The provision of such a gap may for example have advantages with regard to manufacturing tolerances to be compensated. At least one box part bears by way of a first contact surface against at least one side part. The box part and the side part are cohesively joined together by way of the first contact surface. Furthermore, the heat exchanger according to the invention has at least one frame part which is connected in non-positively locking and/or cohesive fashion, for example by pressing and subsequent brazing, to a respective outer edge of the side parts, to a respective outer edge of the base parts, and to a respective outer edge of the box parts.

By way of the selected construction of the heat exchanger according to the invention, the weight thereof can be reduced by up to 30% in relation to a previous housing composed of polyamide PA6 and tension anchors, and the pressure resistance can be greatly increased, such that even pressures of over 3 bar and temperatures of over 200° C. can now be easily accommodated by the metallic housing, and the special construction thereof composed of side parts, box parts, base parts and frame parts, that now fall within the invention. As a result of the omission of the tension anchors, it is furthermore possible for the flat pipes or the pipes generally to be packaged more densely, and thus for the outer dimensions of the heat exchanger to be reduced, though it is alternatively possible for the space hitherto kept in reserve for the tension anchors to now be utilized for the pipes and thus for a heat exchanger surface, whereby an improved specific power of the heat exchanger according to the invention of up to 35% higher than that of current heat exchangers can be achieved.

In an advantageous refinement of the solution according to the invention, at least one outer edge of at least one side part has a bent-over lug as an edge reinforcement, by way of which the side part is connected to the frame part. Here, the bent-over lug is inserted into a corresponding recess on the frame part and is held in positively locking or non-positively locking fashion therein, wherein, in this case, too, a brazed connection is additionally provided, whereby a cohesive connection between the bent-over lug of the side part and the frame part is also realized. By way of the bent-over lug, the side part can be considerably stiffened in the region of its outer edge, and thus the housing, which is partly formed by the side part, can be reinforced. A further advantage here lies in the fact that, in the bending of the frame part to produce the receptacle that receives the bent-over lug of the side part, a relatively large bending radius is realized, which results in relatively low material loading.

The frame part preferably has an S-shaped cross section with a first receptacle and with a second receptacle which is open oppositely to said first receptacle, wherein the outer edges of at least one side part, one base part or one box part are received in the first receptacle. By way of the S-shaped cross section of the frame part in the connecting region to the side part or to the box part or base part, the frame part also exhibits relatively high stiffness while nevertheless being of relatively low weight.

In an advantageous refinement of the solution according to the invention, at least one heat exchanger element is spaced apart from at least one of the base parts, specifically in such a way that a free bypass section is formed at the edge of the second duct system. In said region, the frame part has a projecting collar section which at least partially covers the bypass section in order to reduce a bypass flow of the second fluid through the bypass section. By way of the projecting collar section provided according to the invention, it is thus possible for the undesired bypass of the second fluid to be relatively easily minimized without separate seals being necessary for this purpose. The collar section required for this purpose forms merely an easily deformable projection of the frame part.

In a further advantageous embodiment of the solution according to the invention, the linear second contact surface between the base part and the associated side part is formed by a lug on the side part, which lug engages into a recess on the base. The recess furthermore has two lateral protrusions between which the lug is clamped in the recess. An internal dimension between the two protrusions is thus, in the non-assembled state, at least slightly smaller than an external dimension of the lug on the side part, such that, when the side part is pressed by way of its lug into the recess on the base, the two lateral protrusions are displaced outward, and a non-positively locking connection between the base part and the side part is thus realized. It is self-evidently also the case that the protrusions are also brazed to the lug on the side part, such that, here, a cohesive action is provided in addition to the non-positively locking action. Here, it is self-evidently also conceivable for the lug to be arranged on the base part and for the associated recess to be arranged on the side part.

In a further advantageous embodiment of the solution according to the invention, heat exchanger elements, for example corrugated fins, generally fin structures, are arranged in the second duct system, which heat exchanger elements are in heat-exchanging contact with at least one of the pipes. Such heat-exchanging contact may be realized for example by virtue of the heat exchanger element being brazed to the associated pipe. Such heat exchanger elements increase a heat-exchanging surface area and thus the power of the heat exchanger according to the invention, wherein such heat exchanger elements furthermore give rise to turbulence in the fluid, and thus likewise an improved exchange of heat.

The frame part is expediently connected to the respective outer edge of the side parts, to the respective outer edge of the base parts and to the respective outer edge of the box parts by way of a crimped connection. A crimped connection of said type is in this case realized for example by virtue of the outer edges of the side part, of the base part or of the box part being pressed into the first receptacle of the frame part. A crimped connection of said type permits pre-fixing, which fixes the heat exchanger according to the invention during a subsequent brazing process such that the heat exchanger does not have to be separately fixed in the brazing furnace, giving rise to considerable process advantages. The cohesive connection may in this case be realized for example by way of a braze plating along the respective outer edges and/or in the first receptacle of the frame part.

Further important features and advantages of the invention will emerge from the subclaims, from the drawings and from the associated figure description on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein identical or similar or functionally identical components are denoted by the same reference designations.

DETAILED DESCRIPTION

Figure 1:
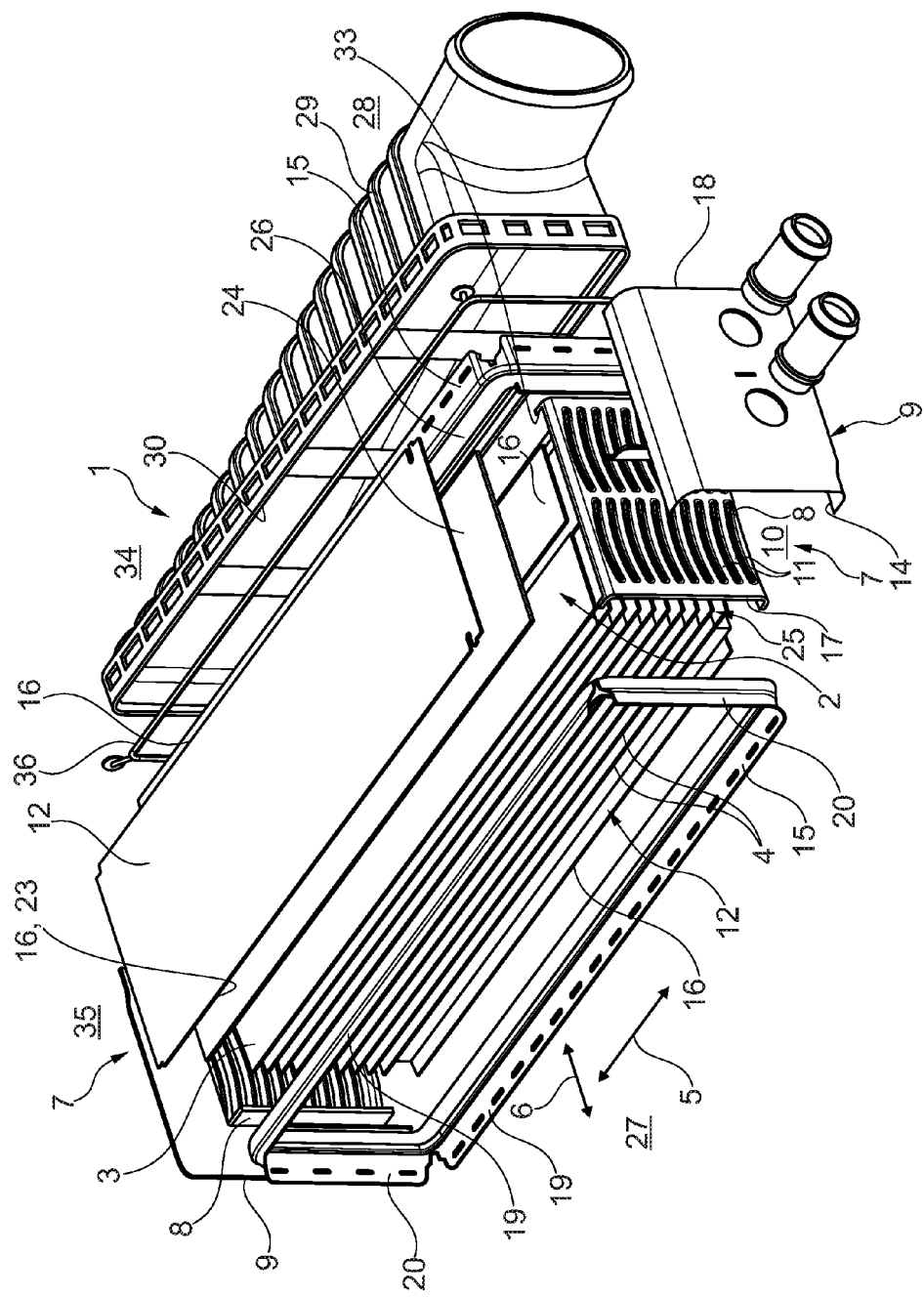
FIG. 1 is an exploded illustration of the heat exchanger according to the invention.
Figure 2:
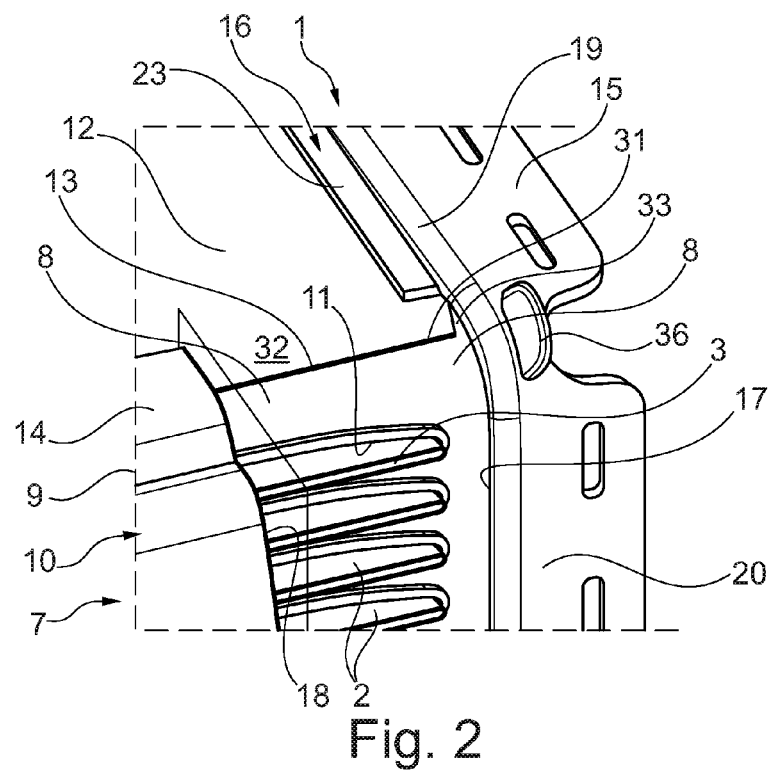
FIG. 2 is a detail illustration of the heat exchanger according to the invention in the region of a transition between a side part, a base part, a box part and a frame part.
Figure 3:
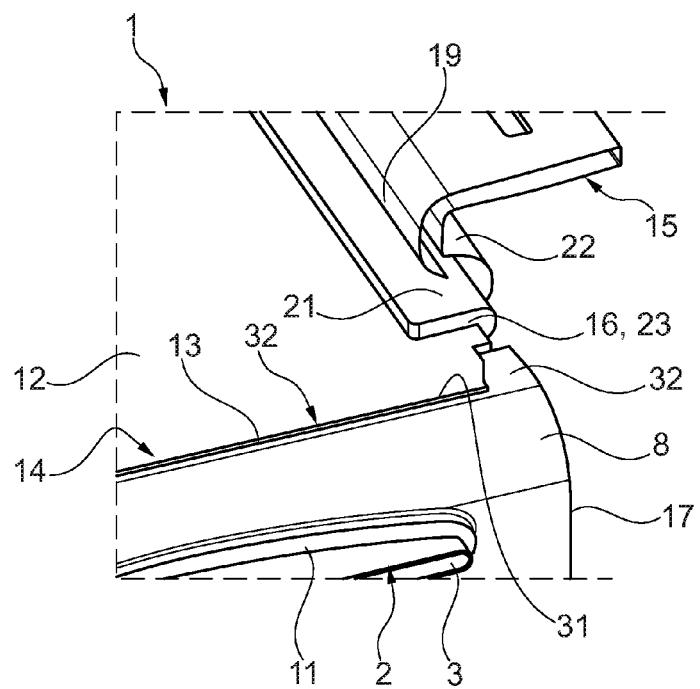
FIG. 3 is an illustration as in FIG. 2, but with a partially sectional frame part without a box part.

Corresponding to FIGS. 1 to 3, a heat exchanger 1 according to the invention, which may for example be in the form of an indirect charge-air cooler for an internal combustion engine 34, has pipes 2, in particular flat pipes, which form a first duct system 3 for a first fluid which flows in a first flow direction 5. Between the pipes 2 there is formed a second duct system 4, which is fluidically separated from the first duct system 3, for a second fluid which can be caused to flow through in a second flow direction 6. Here, the first fluid is for example coolant, whereas the second fluid may be charge air. Also provided are two collectors 7 which are fluidically separated from the second duct system 4 and of which at least one has a base part 8 and a box part 9 which delimit a collecting chamber 10, which is fluidically connected to at least one of the pipes 2, of the collector 7. Here, each base part 8 has openings 11, for example in the form of turned-up rim holes, in which the pipes 2 are received or to which the pipes 2 are connected such that the associated collecting chamber 10 is fluidically separated from the second duct system 4. Opposite, and so as to form a housing, there are furthermore provided two side parts 12 for the fluidic delimitation of the second duct system 4, between which side parts the pipes 2 are arranged. Here, it is now possible for at least one base part 8 to bear against at least one side part 12 by way of a linear second contact surface 13 (cf. in particular FIGS. 2 and 3), whereas at least one box part 9 bears against at least one side part 12 by way of a first contact surface 14. Here, it is also conceivable for a gap to be arranged between the base part 8 and the side part 12, which gap contributes to the compensation of manufacturing tolerances. Said gap is subsequently bridged, and thereby sealingly closed off, by the box part 9. Here, the box part 9 bears against the second contact surface 14 and against the base part 8, and is furthermore sealingly brazed. The base part 8 and the associated side part 12 are preferably cohesively joined together by way of the second contact surface 13, whereas the box part 9 and the side part 12 are cohesively joined together, for example by brazing, by way of the first contact surface 14. The heat exchanger 1 according to the invention furthermore has at least one frame part 15, in this case two frame parts 15, which is connected in non-positively locking and/or cohesive fashion, for example by pressing and subsequent brazing, to a respective outer edge 16 of the side parts 12, a respective outer edge 17 of the base parts 8 and to a respective outer edge 18 of the box parts 9. Here, a cohesive connection of said type ensures the sealing action and supports the mechanical connection.

At least one outer edge 16 of at least one side part 12 may furthermore have a bent-over lug 23 as an edge reinforcement, as can be seen for example from FIGS. 1 to 3. By way of said bent-over lug 23, which is formed as an edge reinforcement, the side part 12 is connected to the frame part 15. Here, the frame part 15 has an S-shaped cross section (cf. also FIGS. 3 to 5) with a first receptacle 21 and a second receptacle 22 which is open oppositely to said first receptacle, wherein the outer edges of at least one side part 12 of a base part 8 or of a box part 9 are received in the first receptacle 21. The side edges 16, 17 and 18 are in this case clamped or pressed into the first receptacle 21 of the frame part 15, such that the frame part 15 is connected to the respective outer edge 16 of the side parts 12, to the respective outer edge 17 of the base parts 8 and to the respective outer edge 18 of the box parts 9 by way of a pressed connection. A pressed connection of said type constitutes a non-positively locking connection, and enables the stated parts to be fixed to one another. To support the mechanical fixing, and/or also to support a sealing function, the individual outer edges 16, 17 and 18 may additionally also be brazed in the respective receptacle 21 of the frame part 12.

Figure 4:
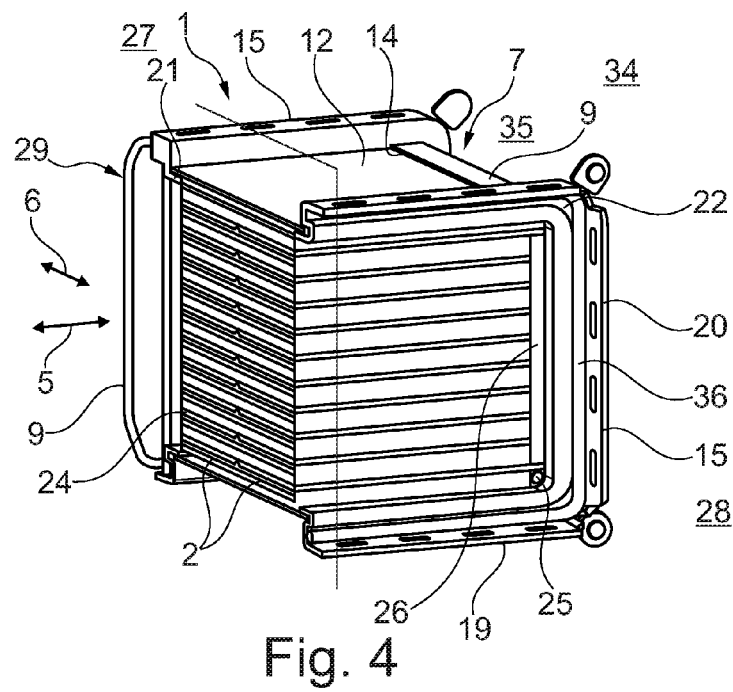
FIG. 4 shows a view from the side of the heat exchanger according to the invention.
Figure 5:
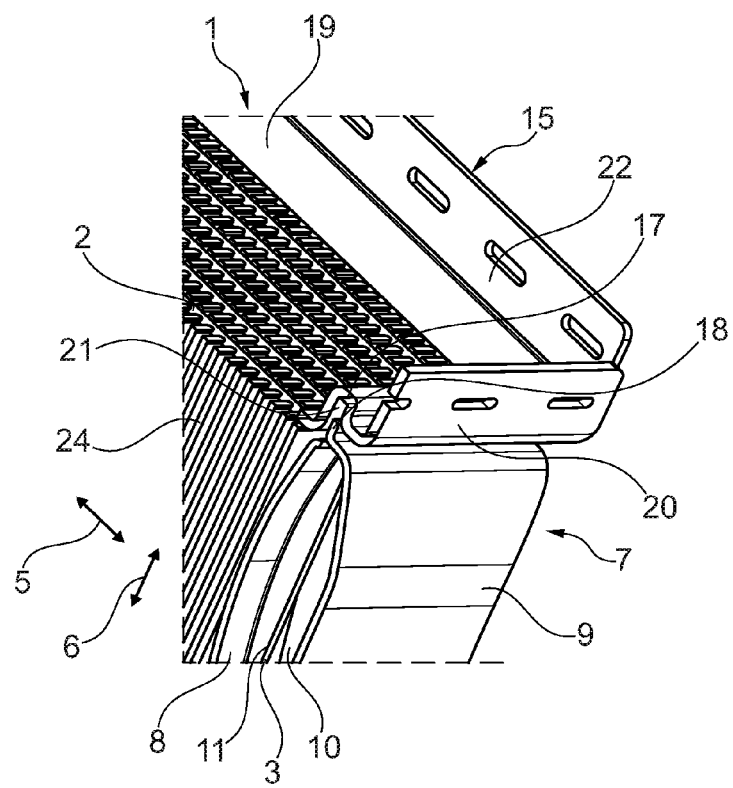
FIG. 5 is a detail illustration, in section, of the transition of the base part and of the box part into the frame part.

Viewing FIGS. 1 and 4, it can be seen that the frame part 15 is in the form of a closed tetragonal frame with two longitudinal sides 19 and two transverse sides 20, wherein each longitudinal side 19 is connected to an associated outer edge 16 of a side part 12, and each transverse side 20 is connected to an associated outer edge 17 of the base part 8 and of the box part 9.

To be able to improve a transfer of heat between the first and the second fluid, heat exchanger elements 24, in particular fin structures, are arranged in the second duct system 4, which heat exchanger elements are in heat-exchanging contact with at least one of the pipes 2. Here, such heat exchanger elements 24 may also be arranged between the side part 12 arranged at the outside and the adjacent pipes 2. To be able to further intensify an exchange of heat, the heat exchanger elements 24 may be connected, in particular by brazing, to at least one of the pipes 2 and/or, depending on position, to the side part 12.

Viewing FIG. 1 in particular, it can be seen that at least one heat exchanger element 24 is spaced apart from at least one of the base parts 8, specifically such that a free bypass section 25 remains at the edge of the second duct system. Here, the frame part 15 may have a collar section 26 (cf. also FIG. 4) which at least partially covers the bypass section 25 in order to reduce an undesired bypass flow of the second fluid.

Viewing once again the non-positively locking and, in part, even positively locking connection between the side part 12 and the base part 8, it can be seen from FIG. 2 that the linear second contact surface 13 is formed by a lug 32 on the side part, which lug engages into a recess 31 on the base. Here, the recess 31 has two lateral protrusions 33 (cf. also FIG. 1) between which the lug 32 is clamped in the recess 31. Thus, during assembly of the heat exchanger 1 according to the invention, the side part 12 is pressed by way of its lug 32 into the recess 31 on the base so as to laterally displace the protrusions 33. Here, it is self-evidently also conceivable for the lug 32 to be arranged on the base part 8 and for the associated recess 31 to be arranged on the side part 12.

In general, with the heat exchanger 1 according to the invention and the frame parts 15, side parts 12, base parts 8 and box parts 9 thereof, it is possible to realize a heat exchanger 1 which not only exhibits high power but is at the same time also optimized in terms of weight, because said heat exchanger, by contrast to previous heat exchangers, no longer requires a very heavy plastics housing. A heavy plastics housing of said type was necessary in order to be able to accommodate the acting pressures without problems.

The heat exchanger 1 according to the invention is used in an internal combustion engine 34, in this case in particular as a charge-air cooler. Here, the side parts 12 of the heat exchanger 1 may form an outer wall of a fresh-air system 35. Said fresh-air system 35 normally has a first duct section 27 arranged upstream of the heat exchanger 1 and a second duct section 28 arranged downstream of the heat exchanger 1, wherein the heat exchanger 1 is mechanically and fluidically connected to at least one of the duct sections 27, 28 by way of a frame part 15.

The first or second duct section 27, 28 may in this case have a diffuser 29 as illustrated in FIG. 1, the outer edge 30 of which diffuser is received in the second receptacle 22 of the frame part 15 of the heat exchanger 1 and is held there for example likewise by way of a crimped connection. To be able to seal off a connection between the diffuser 29 on one side and the frame part 15 on the other side, it is additionally possible for a seal 36 (cf. FIGS. 1, 2 and 4) to be provided.

The invention claimed is:

1. A heat exchanger for an internal combustion engine, comprising:
   a plurality of pipes defining a first duct system for a first fluid which flows in a first flow direction;
   a second duct system disposed between the plurality of pipes for a second fluid to flow through in a second flow direction, the second duct system fluidically separated from the first duct system;
   at least two collectors fluidically separated from the second duct system, wherein at least one collector of the at least two collectors includes a base part and a box part that defines a collecting chamber fluidically connected to at least one pipe of the plurality of pipes;
   the base part of the at least one collector including at least one opening connected to the at least one pipe such that the collecting chamber is fluidically separated from the second duct system;
   at least two opposite side parts for fluidic delimitation of the second duct system, wherein the plurality of pipes are arranged between the at least two side parts and the base part transitions into at least one side part of the at least two side parts in a surface-flush manner;

the box part of the at least one collector engaging via a first contact surface against at least one side part of the at least two side parts;

the box part and the at least one side part are cohesively joined to one another via the first contact surface; and at least one frame part coupled in at least one of a non-positively locking connection and a cohesive connection to at least one of a respective outer edge of the at least two side parts, a respective outer edge of the base part, and a respective outer edge of the box part.

2. The heat exchanger according to claim 1, wherein at least one of:

the respective outer edge of at least one of the at least two side parts includes a bent-over lug configured as an edge reinforcement, the bent-over lug of the respective outer edge connecting the at least one side part to the at least one frame part; and the at least one frame part is cohesively connected to the respective outer edge of the at least two side parts, the respective outer edge of the base part, and the respective outer edge of the box part.

3. The heat exchanger according to claim 1, wherein the at least one frame part is connected via a pressed connection to the respective outer edge of the at least side parts, the respective outer edge of the base part and the respective outer edge of the box part.

4. The heat exchanger according to claim 1, wherein the at least one frame part is structured a closed tetragonal frame including two longitudinal sides and two transverse sides, wherein each longitudinal side is connected to the respective outer edge of one side part, and each transverse side is connected to the respective outer edge of the base part and of the box part.

5. The heat exchanger according to claim 1, wherein the at least one frame part has an S-shaped cross section including a first receptacle and a second receptacle, the second receptacle open oppositely to the first receptacle, and wherein the respective outer edge of at least one side part, of the base part or of the box part is received in the first receptacle.

6. The heat exchanger according to claim 1, further comprising at least one of:

a plurality of heat exchanger elements arranged in the second duct system and in heat-exchanging contact with at least one of the plurality of pipes; and a heat exchanger element is arranged between at least one of the at least two side parts and at least one of the plurality of pipes.

7. The heat exchanger according to claim 6, wherein at least one of the plurality of heat exchanger elements is brazed to the at least one of the plurality of pipes.

8. The heat exchanger according to claim 6, wherein at least one of the plurality of heat exchanger elements is spaced apart from the base part such that a free bypass section is defined at an edge of the second duct system, and wherein the at least one frame part includes a projecting collar section which at least partially covers the free bypass section to reduce a bypass flow of the second fluid through the free bypass section.

9. The heat exchanger according to claim 1, wherein the base part engages via a linear second contact surface against the at least one side part, the linear second contact surface including a lug disposed on the at least one side part engaging into a recess disposed on the base part, wherein the recess includes at least two lateral protrusions and the lug is clamped between the at least two lateral protrusion in the recess.

10. An internal combustion engine, comprising:

a heat exchanger configured as a charge-air cooler, the heat exchanger including:

a first duct system including a plurality of pipes for a first fluid which flows in a first flow direction;

a second duct system disposed between the plurality of pipes for a second fluid to flow through in a second flow direction, the second duct system fluidically separated from the first duct system;

a collector fluidically separated from the second duct system, the collector including a base part and a box part defining a collecting chamber fluidically connected to at least one pipe of the plurality of pipes;

the base part of the collector including at least one opening connected to the at least one pipe such that the collecting chamber is fluidically separated from the second duct system;

at least two opposite side parts for fluidic delimitation of the second duct system, wherein the plurality of pipes are arranged between the at least two side parts and the base part transitions into at least one side part of the at least two side parts in a surface-flush manner;

the box part of the collector engaging via a first contact surface against at least one side part of the at least two side parts;

the box part and the at least one side part are cohesively joined to one another via the first contact surface; and at least one frame part coupled in at least one of a non-positively locking connection and a cohesive connection to at least one of a respective outer edge of the at least two side parts, a respective outer edge of the base part, and a respective outer edge of the box part.

11. The internal combustion engine according to claim 10, further comprising a fresh-air system, wherein the at least two side parts of the heat exchanger define an outer wall portion of the fresh-air system.

12. The internal combustion engine according to claim 11, wherein the fresh-air system includes a first duct section arranged upstream of the heat exchanger and a second duct section arranged downstream of the heat exchanger, and wherein the heat exchanger is mechanically and fluidically connected to at least one of the first duct section the second duct section via the at least one frame part.

13. The internal combustion engine according to claim 12, wherein the first duct section or the second duct section includes a diffuser having an outer edge that is received in a receptacle of the at least one frame part.

14. The internal combustion engine according to claim 10, wherein the at least one frame part is structured a closed tetragonal frame including two longitudinal sides and two transverse sides, wherein each longitudinal side is connected to the respective outer edge of an associated side part, and each transverse side is connected to the respective outer edge of the base part and of the box part.

15. The internal combustion engine according to claim 10, wherein the at least one frame part has an S-shaped cross section including a first receptacle and a second receptacle, the second receptacle open oppositely to the first receptacle, and wherein the respective outer edge of at least one side part, of the base part or of the box part is received in the first receptacle.

16. The heat exchanger according to claim 1, further comprising a fin structure arranged between at least one side part of the at least two side parts and at least one pipe of the plurality of pipes.

17. The heat exchanger according to claim 16, wherein the fin structure is brazed to the at least one pipe of the plurality of pipes.

18. The heat exchanger according to claim 16, wherein the fin structure is spaced apart from the base part such that a free bypass section is defined at an edge of the second duct system, and wherein the at least one frame part includes a projecting collar section which at least partially covers the free bypass section to reduce a bypass flow of the second fluid through the free bypass section.

19. The heat exchanger according to claim 1, further comprising a plurality of fin structures arranged in the second duct system in heat-conducting contact with at least one of the plurality of pipes.

20. An indirect charge-air cooler for an internal combustion engine, comprising:
- a first duct system including a plurality of pipes for a first fluid which flows in a first flow direction;
- a second duct system disposed between the plurality of pipes for a second fluid to flow through in a second flow direction, the second duct system fluidically separated from the first duct system;
- a collector fluidically separated from the second duct system, the collector including a base part and a box part defining a collecting chamber fluidically connected to at least one pipe of the plurality of pipes;
- the base part of the collector including at least one opening connected to the at least one pipe such that the collecting chamber is fluidically separated from the second duct system;
- at least two opposite side parts for fluidic delimitation of the second duct system, wherein the plurality of pipes are arranged between the at least two side parts and the base part transitions into at least one side part of the at least two side parts in a surface-flush manner;
- the box part of the collector engaging via a first contact surface against at least one side part of the at least two side parts;
- the box part and the at least one side part are cohesively joined to one another via the first contact surface; and
- at least one frame part coupled in at least one of a non-positively locking connection and a cohesive connection to at least one of a respective outer edge of the at least two side parts, a respective outer edge of the base part, and a respective outer edge of the box part.

* * * * *